(12) United States Patent
Duncan

(10) Patent No.: US 10,758,817 B1
(45) Date of Patent: Sep. 1, 2020

(54) GAME CONTROLLER

(71) Applicant: Branden Duncan, Eden Prairie, MN (US)

(72) Inventor: Branden Duncan, Eden Prairie, MN (US)

( * ) Notice: Subject to any disclaimer, the term of this patent is extended or adjusted under 35 U.S.C. 154(b) by 0 days.

(21) Appl. No.: 16/030,118

(22) Filed: Jul. 9, 2018

Related U.S. Application Data

(60) Provisional application No. 62/607,079, filed on Dec. 18, 2017, provisional application No. 62/534,281, filed on Jul. 19, 2017.

(51) Int. Cl.
*G09G 5/00* (2006.01)
*A63F 13/24* (2014.01)
(Continued)

(52) U.S. Cl.
CPC .............. *A63F 13/24* (2014.09); *A63F 13/22* (2014.09); *A63F 13/23* (2014.09); *A63F 2300/1018* (2013.01)

(58) Field of Classification Search
CPC .............. A63F 13/24; A63F 2300/1006; A63F 2300/1043; G06F 3/011; G05G 9/04737
See application file for complete search history.

(56) References Cited

U.S. PATENT DOCUMENTS 5,959,863 A * 9/1999 Hoyt ...................... G05G 9/047
700/85
2004/0046735 A1* 3/2004 Gombert ............... G06F 3/0338
345/156

(Continued)

*Primary Examiner* — Lawrence S Galka
(74) *Attorney, Agent, or Firm* — Vidas Arrett & Steinkraus P.A.

(57) ABSTRACT

The inventive game controller has a base portion and an upper portion. The base portion and the upper portion are constructed and arranged so that the base portion is stationary relative to the upper portion; and when the upper portion is moved parallel to the base portion, the game controller translates the relative motion of the upper portion to the base portion into programmable keystrokes or analog movements, which in turn correspond to movements with the game; the upper portion moving forward relative to the base portion translates to forward movement in the game; the upper portion moving backwards relative to the base portion translates to backwards movement in the game; the upper portion moving left or twisting left relative to the base portion translates to spinning; left or strafing left in the game; the upper portion moving right or twisting right relative to the base portion translates to right spinning or right strafing in the game. The upper portion has a palm portion, a raised portion over which the fingers extend, and a plurality of user defined function keys arranged in at least one row. The upper portion having a palm portion, a raised portion over which the fingers extend, and a plurality of user defined function keys arranged in three rows, with the row closest to the palm portion raised higher than the other two rows, so that arching a finger allows striking the front two rows of keys, while flattening the finger allows striking the back raised key. An electronic device is electrically connected to the plurality of user defined function keys, and there is a connector for connecting the game controller to a computer (or a part of a computer, like the keyboard).

15 Claims, 22 Drawing Sheets

(51) Int. Cl.
*A63F 13/22* (2014.01)
*A63F 13/23* (2014.01)

(56) References Cited

U.S. PATENT DOCUMENTS

2018/0169519 A1* 6/2018 Szmaj ..................... A63F 13/22
2018/0326299 A1* 11/2018 Muramatsu ............. A63F 13/22

* cited by examiner

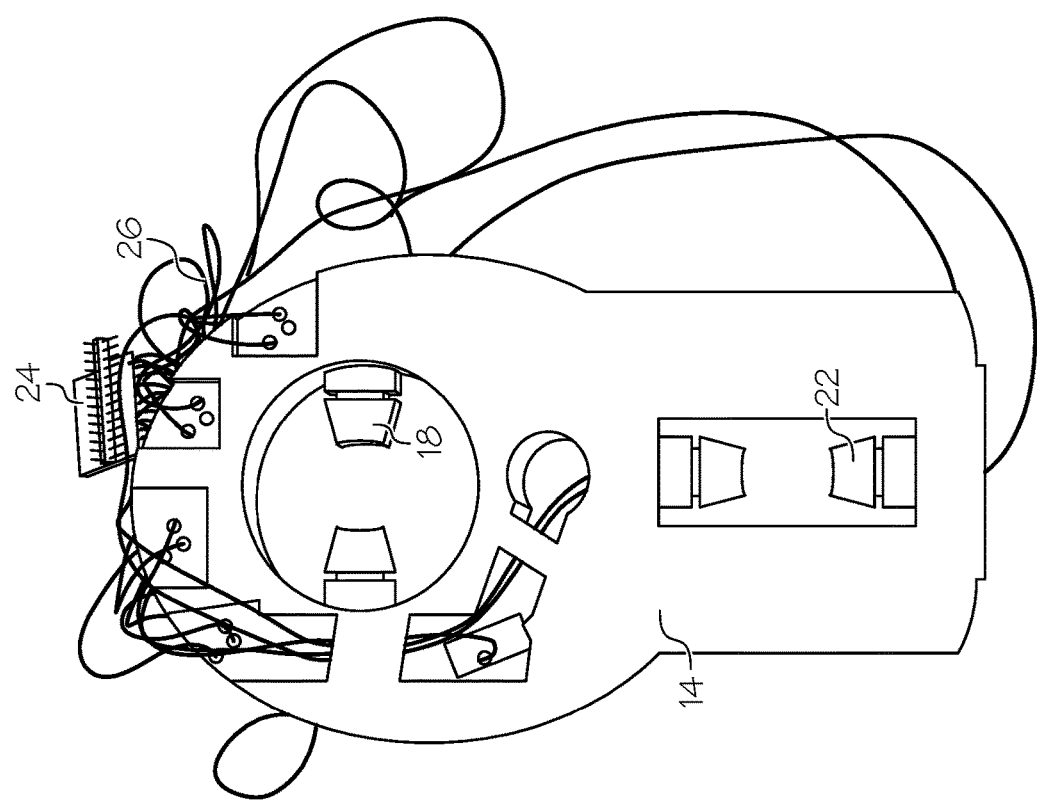
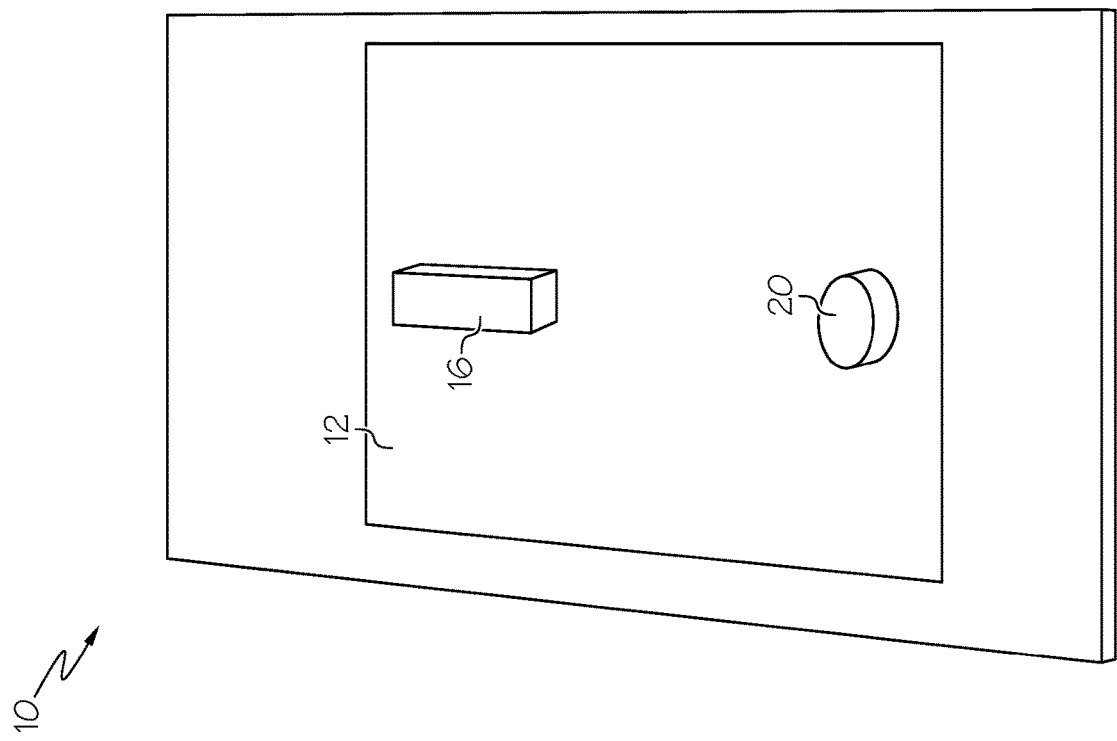
FIG. 1

GAME CONTROLLER

CROSS-REFERENCE TO RELATED APPLICATIONS

Not Applicable

STATEMENT REGARDING FEDERALLY SPONSORED RESEARCH

Not Applicable

FIELD OF THE INVENTION

The present invention relates to a game controller, and more particularly, to a game controller with multiple keys in different positions to provide easy access to a plurality of user defined function keys.

BACKGROUND OF THE INVENTION

There are many computer games which require keyboard combinations to move a character or object forwards, backwards, left, right, or a combination of these movements. A lot of computer games require a lot of attention dedicated to the movement keys described which takes away from other functions that this hand can be better used for. It can also feel awkward and anti-immersive to use a keyboard for controlling these movements.

What is needed is a game controller which is comfortable to use, but which allows a player to easily translate controller movement into movements of an object or character in the game.

BRIEF SUMMARY OF THE INVENTION

The inventive game controller has a base portion and an upper portion. The base portion and the upper portion are constructed and arranged so that the base portion is stationary relative to the upper portion; and when the upper portion is moved parallel to the base portion, the game controller translates the relative motion of the upper portion to the base portion into programmable keystrokes or analog directional movements, which in turn correspond to movements with the game; the upper portion moving forward relative to the base portion translates to forward movement in the game; the upper portion moving backwards relative to the base portion translates to backwards movement in the game; the upper portion moving left or twisting left relative to the base portion translates to spinning left or strafing left in the game; the upper portion moving right or twisting right relative to the base portion translates to right spinning or right strafing in the game. The upper portion has an adjustable palm portion, an adjustable raised portion over which the fingers extend, and a plurality of user defined function keys arranged in at least one row. An electronic device is electrically connected to the plurality of user defined function keys, and there is a connector for connecting the game controller to a computer (or a part of a computer, like the keyboard).

The game controller has three rows of four user defined function keys.

The game controller has thumb switches on the side of the raised portion.

The game controller further includes a plurality of user defined back finger actuated function keys carried above the plurality of user defined function keys.

The game controller further includes a position sensor for controlling the position of an object or player-character in a game, the position sensor being electrically connected to the computer or electronic device.

The game controller allows the upper portion repositions itself back to a center position when the user releases tension from the device.

The game controller position sensor is comprised of a projection from the base portion and a pair of buttons under the upper portion which interact with the projection and control the forward and backwards position of the object in the game, by movement of the upper portion forward and backward relative to the base portion.

The game controller includes a second projection from the base portion and a second pair of buttons under the upper portion which interact with the second projection and control the side to side position of the object in the game, by movement of the upper portion side to side relative to the base portion.

The game controller includes a joystick sensor for controlling the position of an object in a game, the joystick sensor being electrically connected to the electronic device.

The game controller joystick sensor is comprised of a joystick portion connected to the base portion and which fits into am opening on the bottom of the upper portion.

The game controller palm portion or upper palm portion can be adjustably connecting to the base portion to accommodate different hand sizes.

The game controller thumb portion can be adjustably connecting to the base portion to accommodate different hand sizes.

BRIEF DESCRIPTION OF THE DRAWINGS

FIG. 1 is a view of a working 3D printed game controller prototype, with the base portion on the left and the upper portion on the right, showing the bottom side of the upper portion.

FIG. 22 shows the other alternate embodiment with the rails prior to sliding the adjustable piece on.

DETAILED DESCRIPTION OF THE INVENTION

Figure 2:
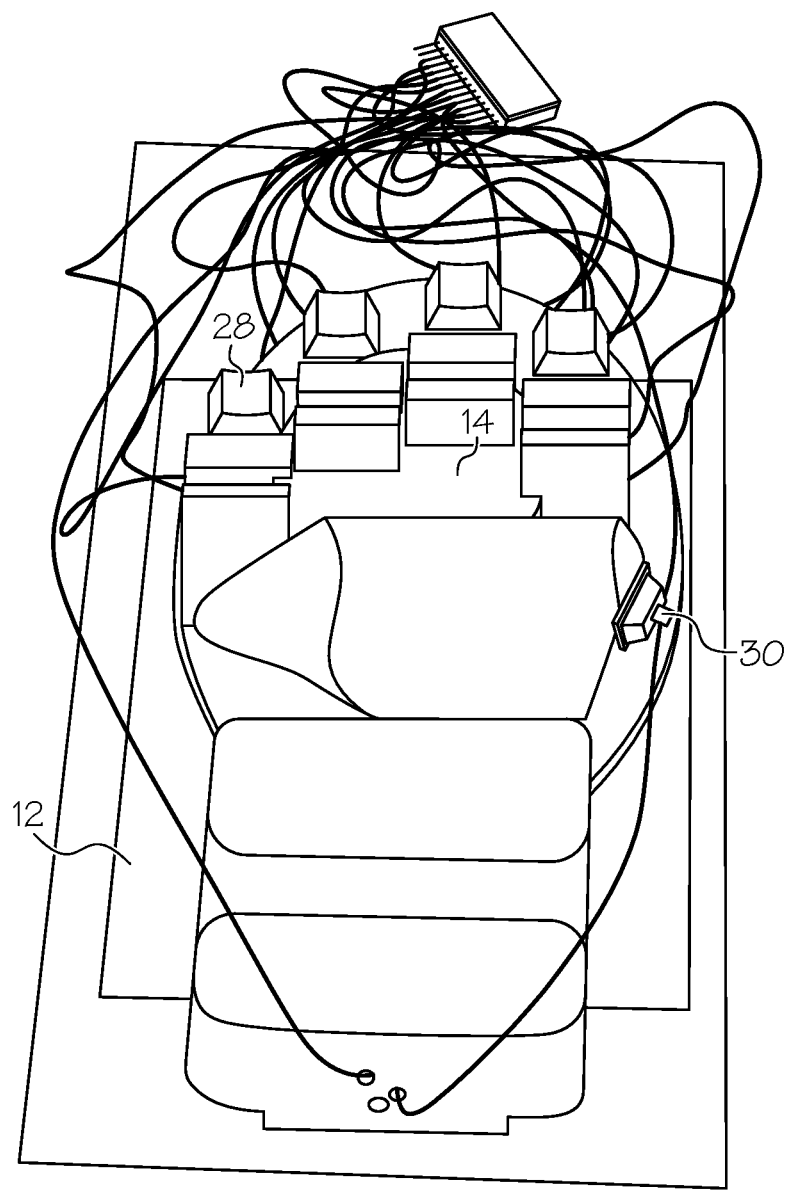
FIG. 2 shows the working 3D printed game controller prototype assembled.

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Referring now to FIG. 1, a view of a working 3D printed game controller prototype, with the base portion on the left and the upper portion on the right, showing the bottom side of the upper portion is shown generally at 10. The base portion 12 is designed to be stationary while the upper portion 14 is designed to move two dimensionally parallel to the bottom portion 12, when assembled together as shown best in FIG. 2. The bottom portion 12 has projections 16 and 20 which cooperate with key pairs 18 and 22 respectively to record forward, backwards, left, right and combinations of these movements. The key pairs are electrically connected to a controller 24 via wires 26 and the controller 24 has a connector, which can be any commercially available connector such as a mini-USB connector, to connect the game controller to a computer or keyboard (not shown). One or more thumb switches or keys could also be provided, as shown at 30.

Figure 3:
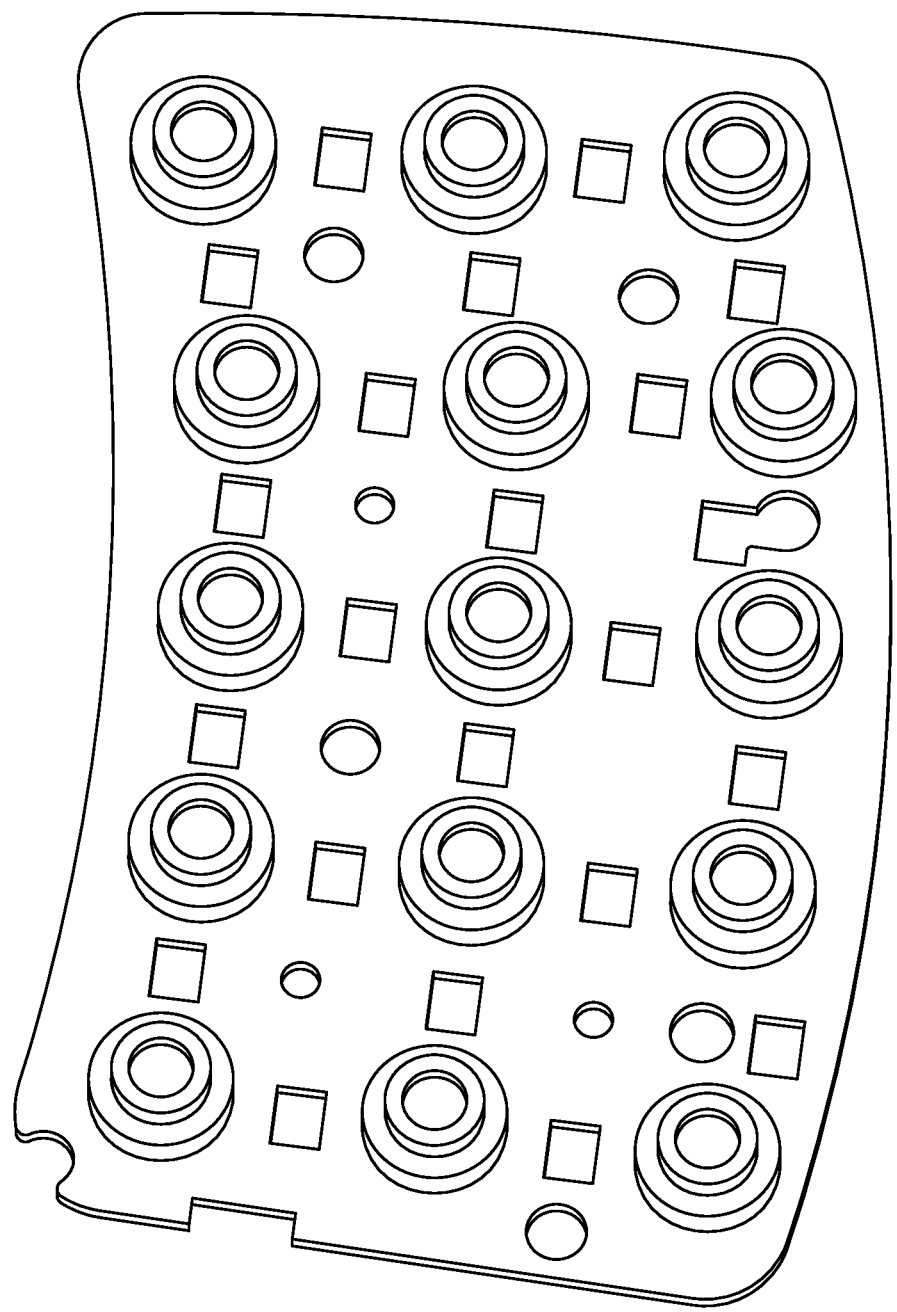
FIG. 3 shows a dome switch alternative to a keyboard key.

FIG. 2 shows the working 3D printed game controller prototype assembled, with the upper portion 14 resting on the projections of the base portion, and constructed and arranged so the upper portion can move relative to the base portion, with the projections depressing the keys to translate the relative motion of the upper portion 14 to the lower portion 12 into keyboard commands which move an object or game character in a game forward, backward, left, right, or left spinning or strafing, or right spinning or strafing, or any other allowable motion permitted by a game. The upper portion also has three rows of keys, which are schematically shown in the 3D printed prototype, with the front row being commercially available mechanical keyswitches from Cherry Americas, shown at 28. In the working version, the three rows of keys would preferably be configured and tilted at an angle to make it easy and comfortable to depress with fingers of a left hand (in this version). A right handed game controller is also contemplated. The keys can be any commercially available key, or could be FIG. 3 shows a dome switch membrane.

Figure 4:
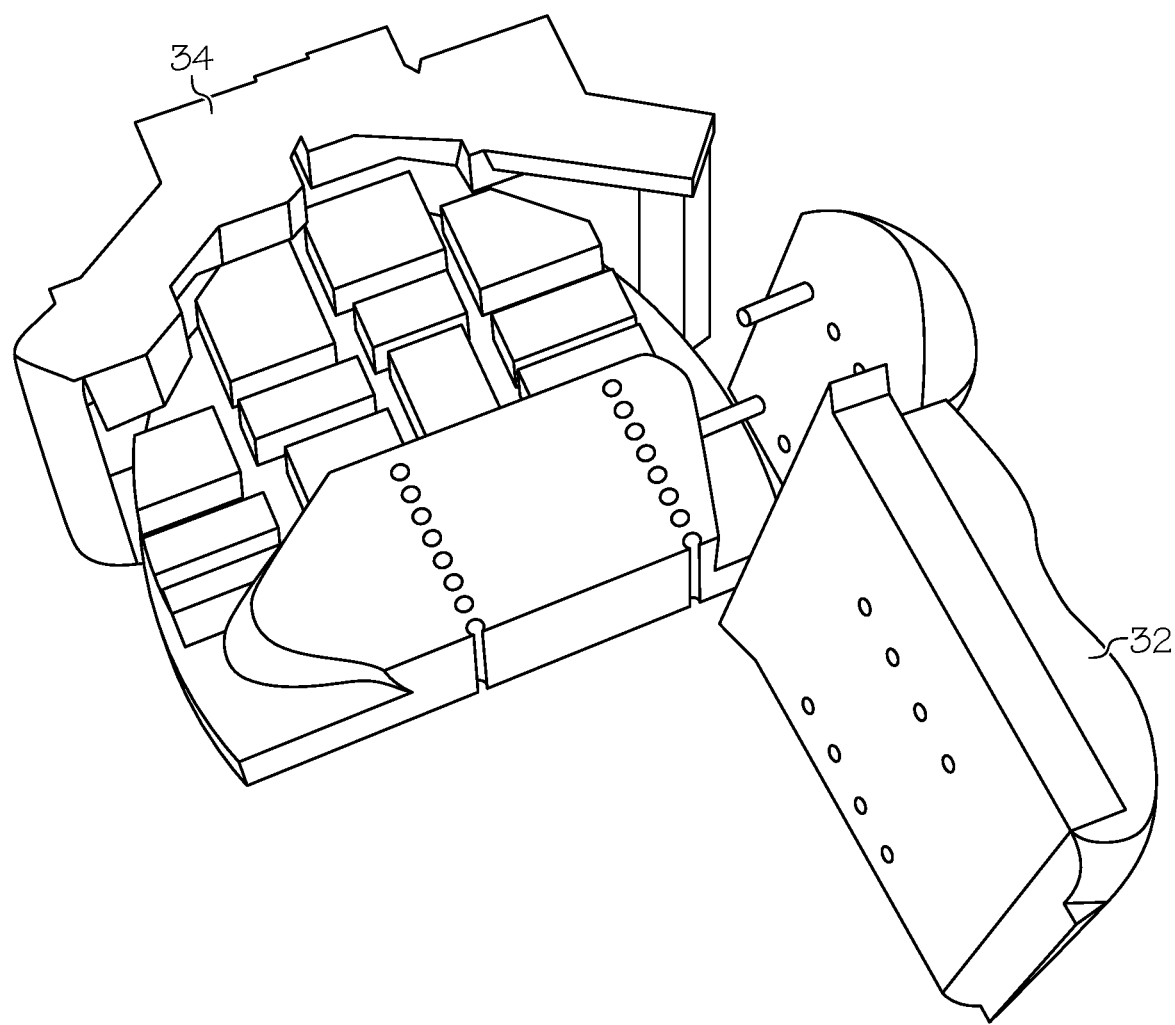
FIG. 4 shows an alternative embodiment in which the palm portion of the upper portion is adjustable.

FIG. 4 shows an alternative embodiment in which the palm portion of the upper portion is adjustable. In the prototype, it is shown as pegs which slot into holes, to move the palm portion 32 towards or away from the rows of keys. In this embodiment, there is also a support 34 to hold four keys which are actuated with the top (or back) of the fingers, by lifting the finger up to depress the key. Once again, the keys can be any commercially available type of key and are electrically connected to the controller to communicate programmable key strokes to the game. The programming for the keys are either stored in the gaming device keyboard or they can be stored on the individual computer they are connected to.

Figure 5:
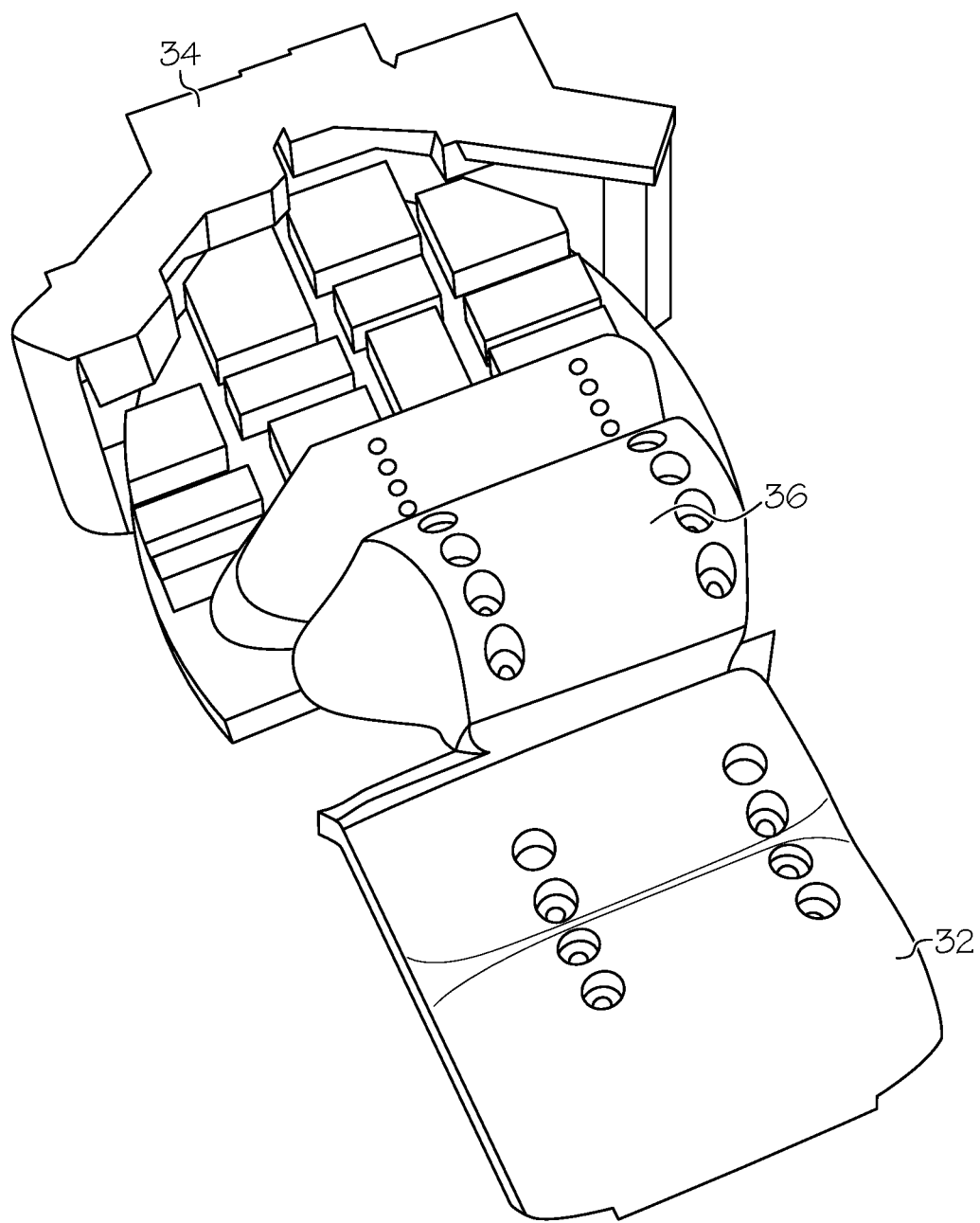
FIG. 5 shows the alternative embodiment in the assembled state.
Figure 6:
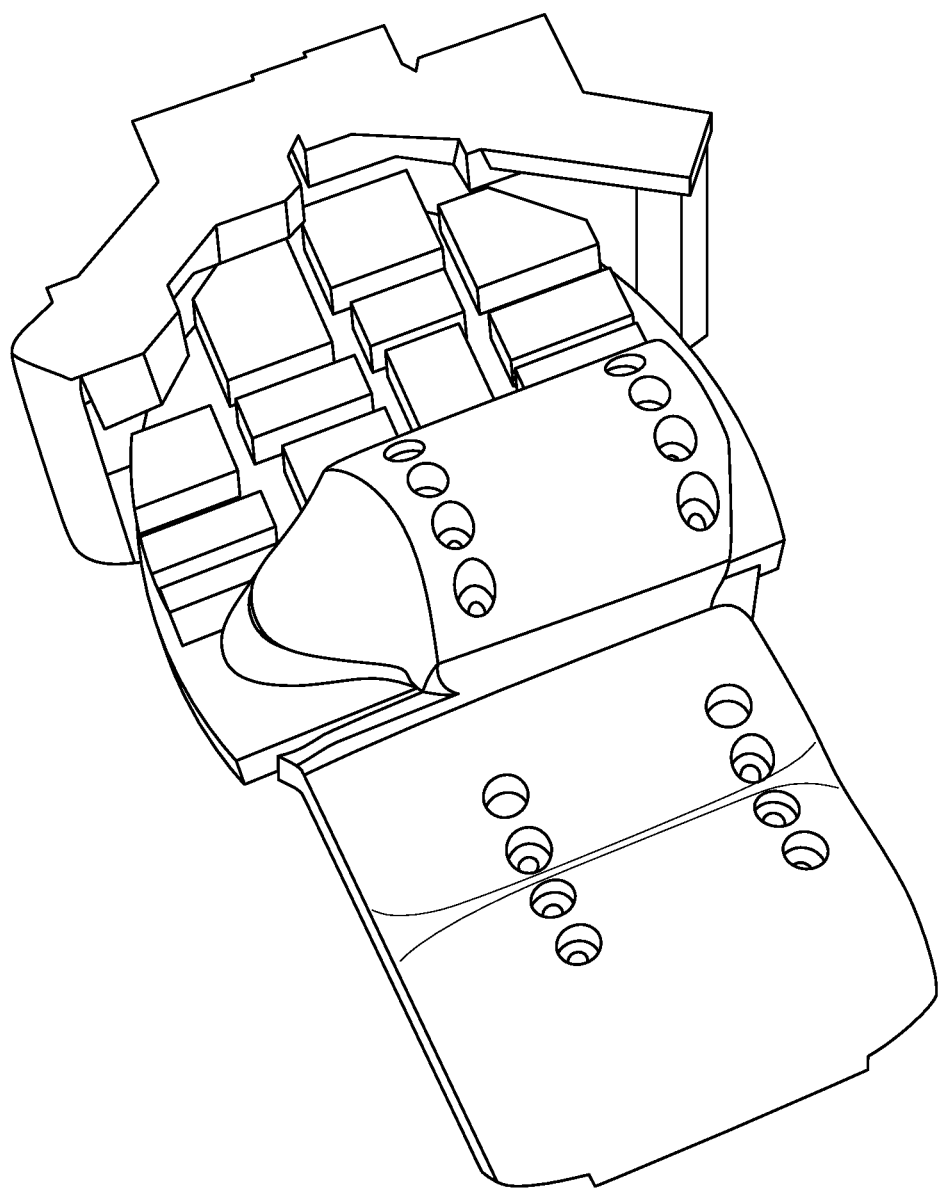
FIG. 6 shows the alternative embodiment in the assembled state from a slightly different angle.

FIGS. 5 and 6 shows the alternative embodiment in the assembled state. In addition to the palm portion 32, there is also a raised portion 36, which provides a finger rest, for comfort.

Figure 7:
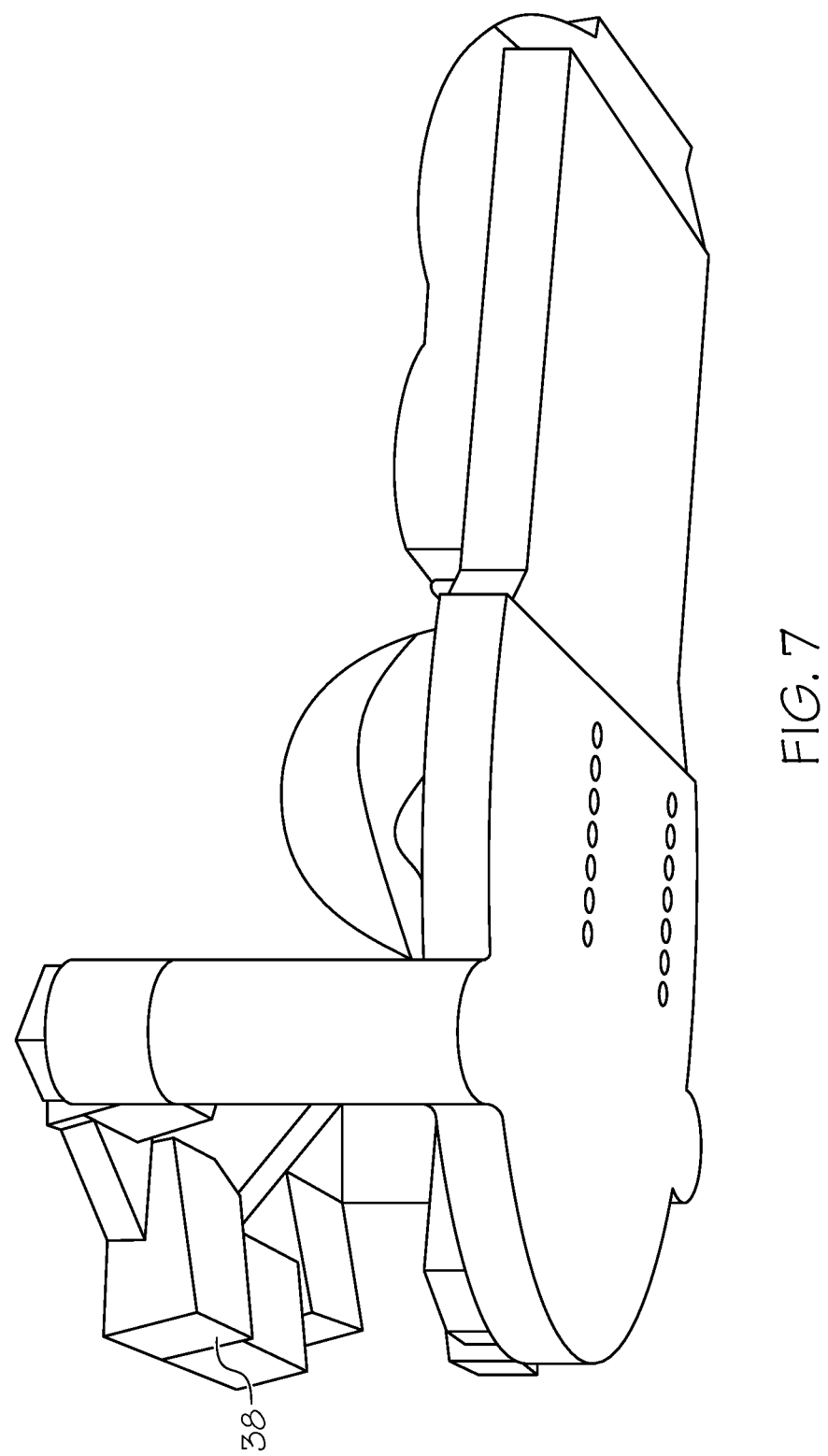
FIG. 7 shows the alternative embodiment in the assembled state, from a side and bottom view.

FIG. 7 shows a side view of the embodiment of FIGS. 4-6, and the 3D printed schematic for the keys or switches is shown at 38. In the working version, keys or switches 38 would be positioned so they can be activated by the back of the four fingers, one button or key per finger.

Figure 8:
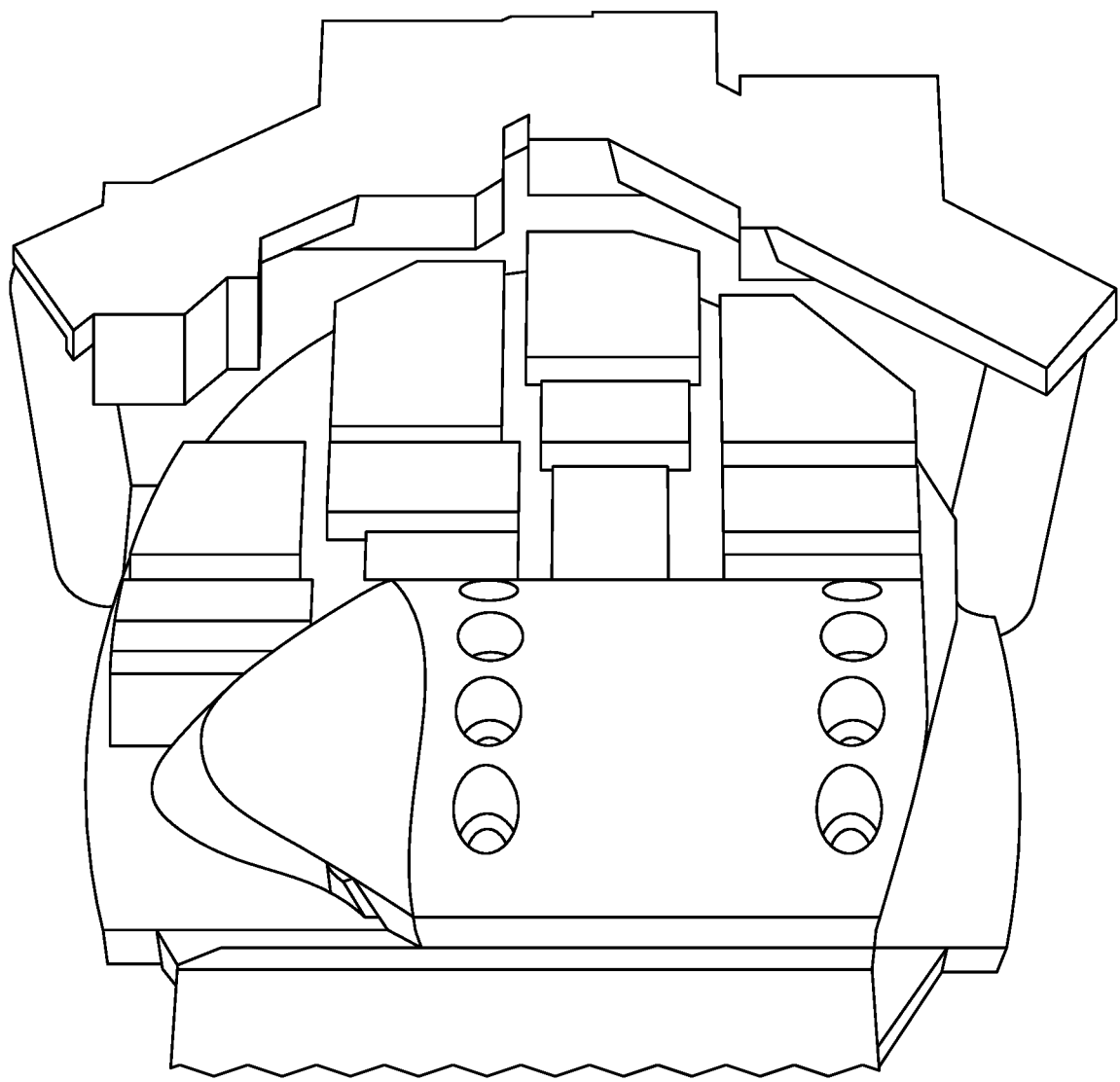
FIG. 8 shows the embodiment of FIG. 4 from the side and bottom.
Figure 9:
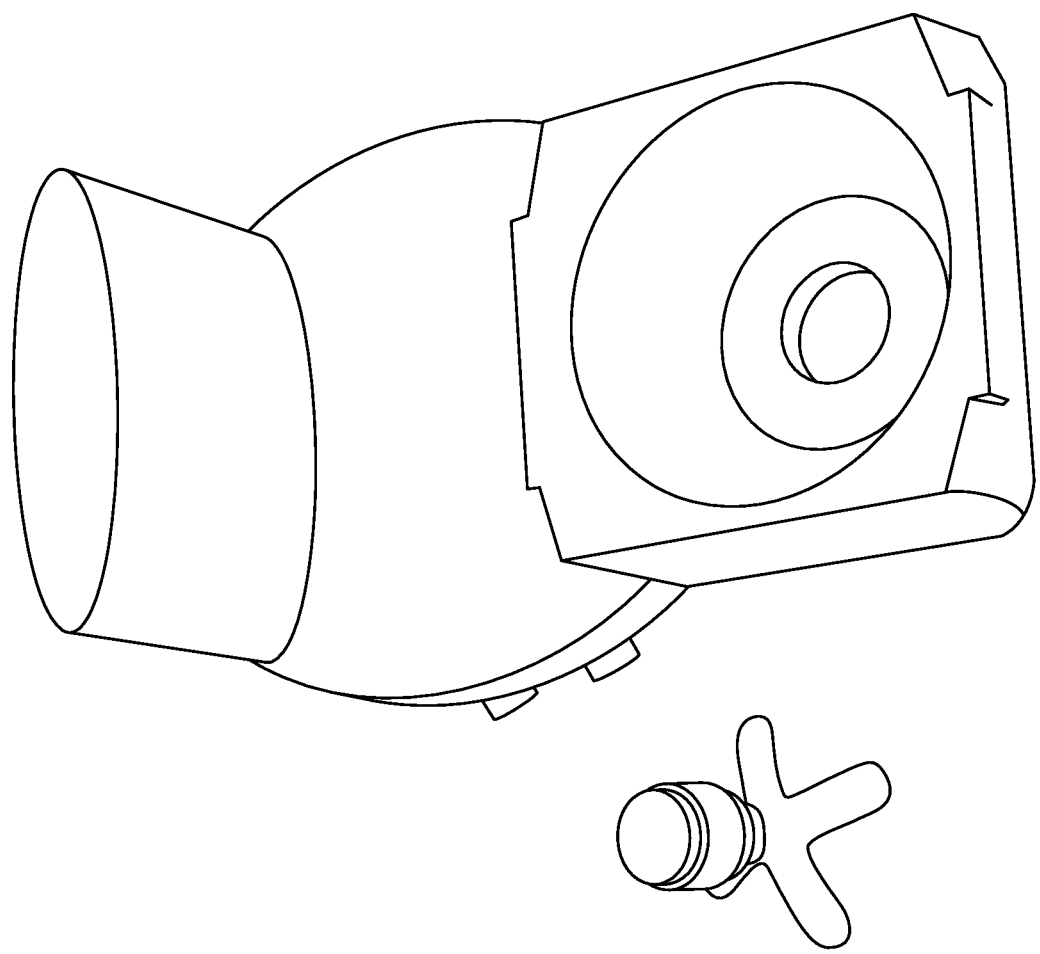
FIGS. 9-13 show an alternative embodiment of a joystick flight controller version of the game controller.
Figure 10:
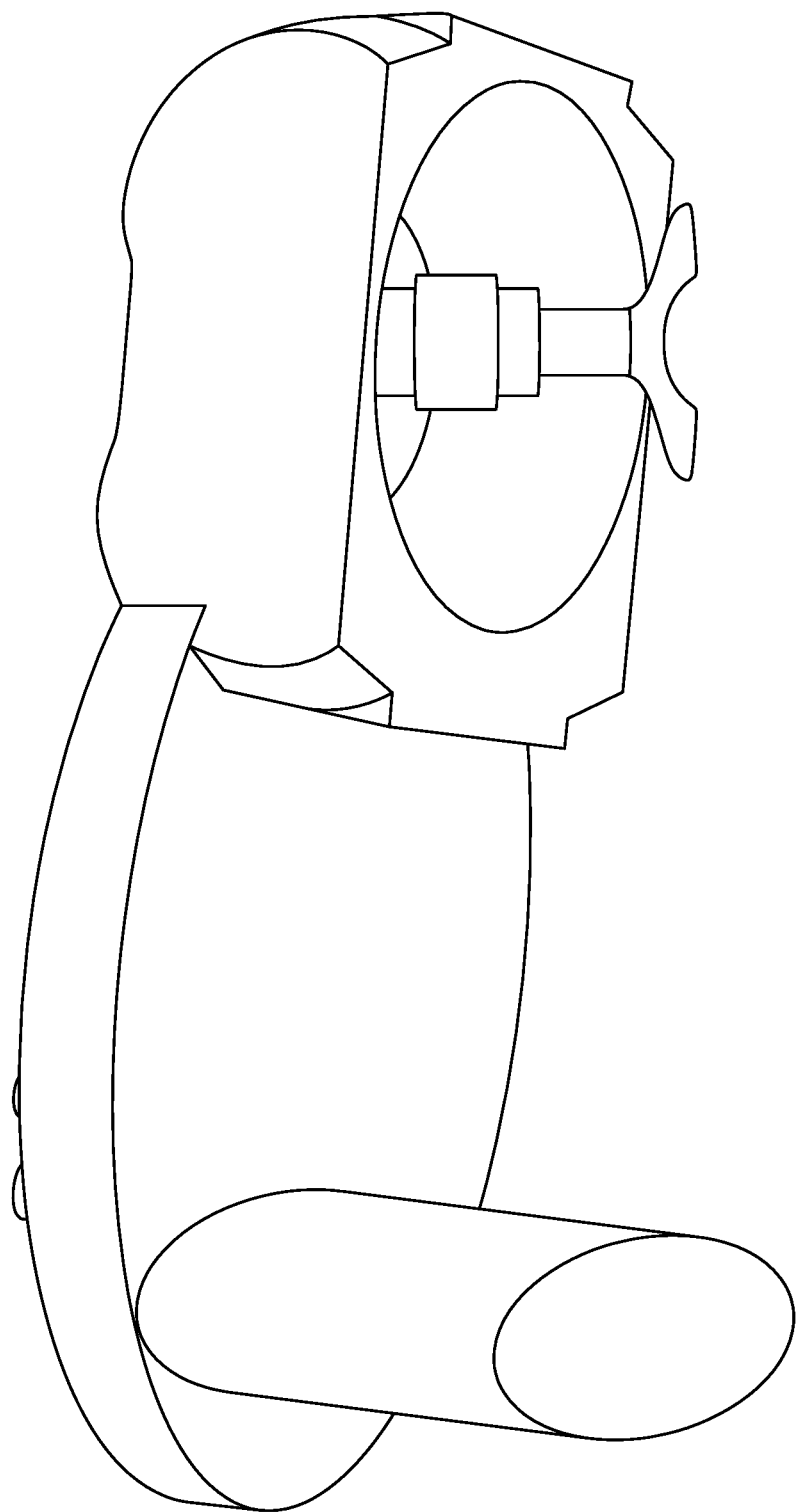
Figure 11:
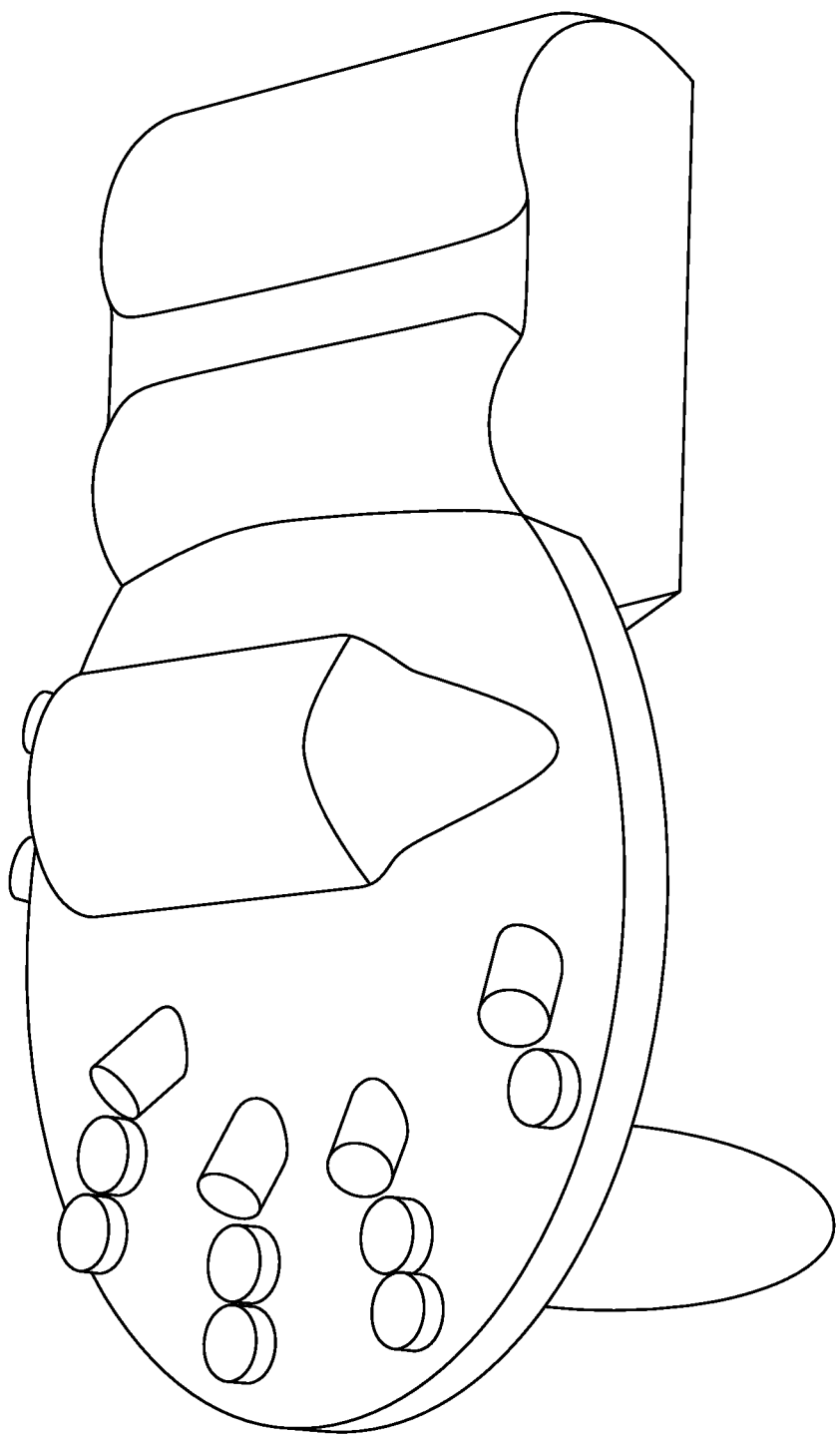
Figure 12:
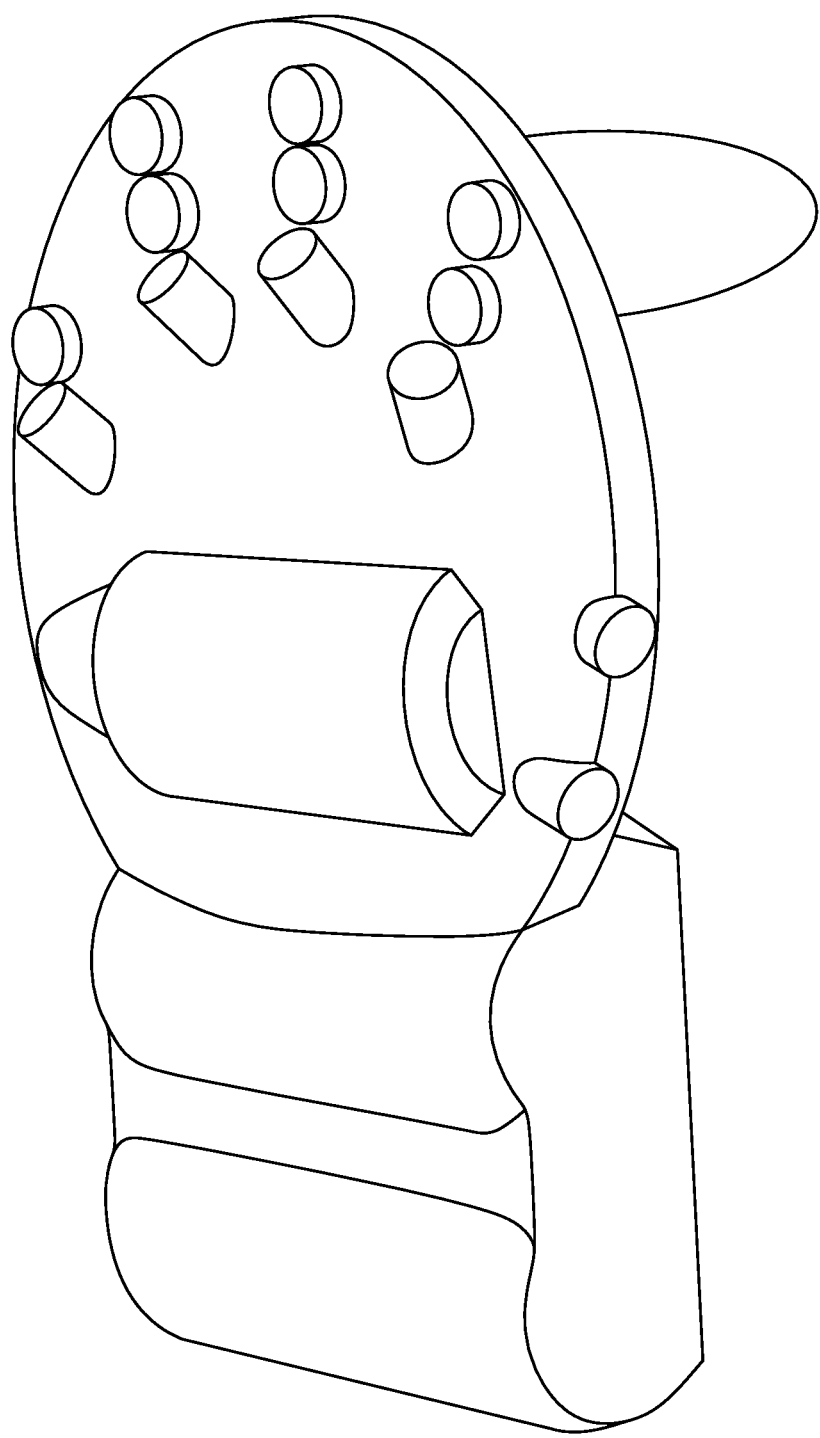
Figure 13:
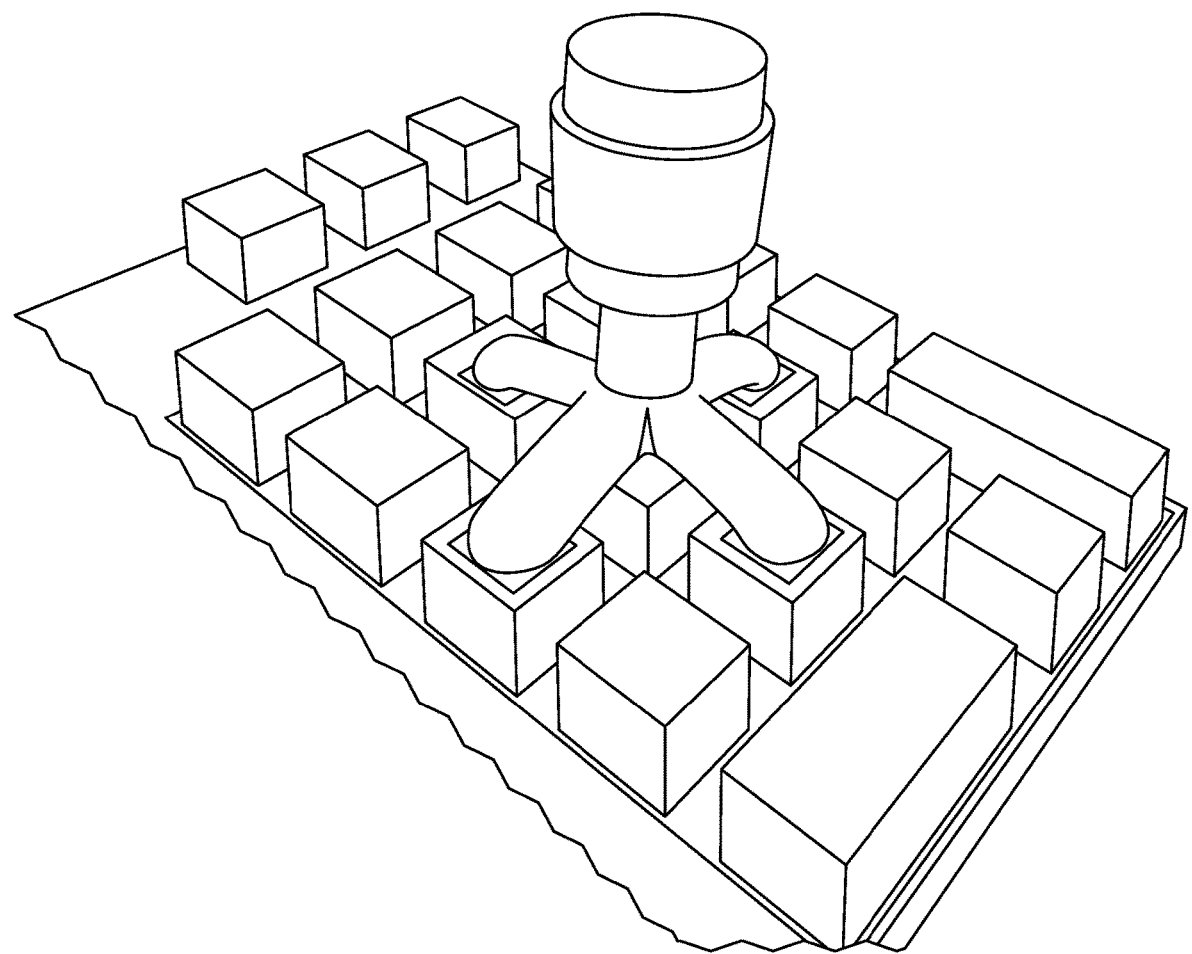

FIG. 8 shows a closer view of the finger rest raised portion 36, with the schematic view of the three rows of keys in front of the finger rest raised portion 36.

FIG. 9-13 shows an alternative embodiment for a 3D joystick type control. The joystick control sits on four keys and the upper portion is moved, which causes the control to depress on or more of the keys, to control movement of an object or game character in a game forward, backward, left, right, or left spinning or strafing, or right spinning or strafing, or any other allowable motion permitted by a game.

Figure 14:
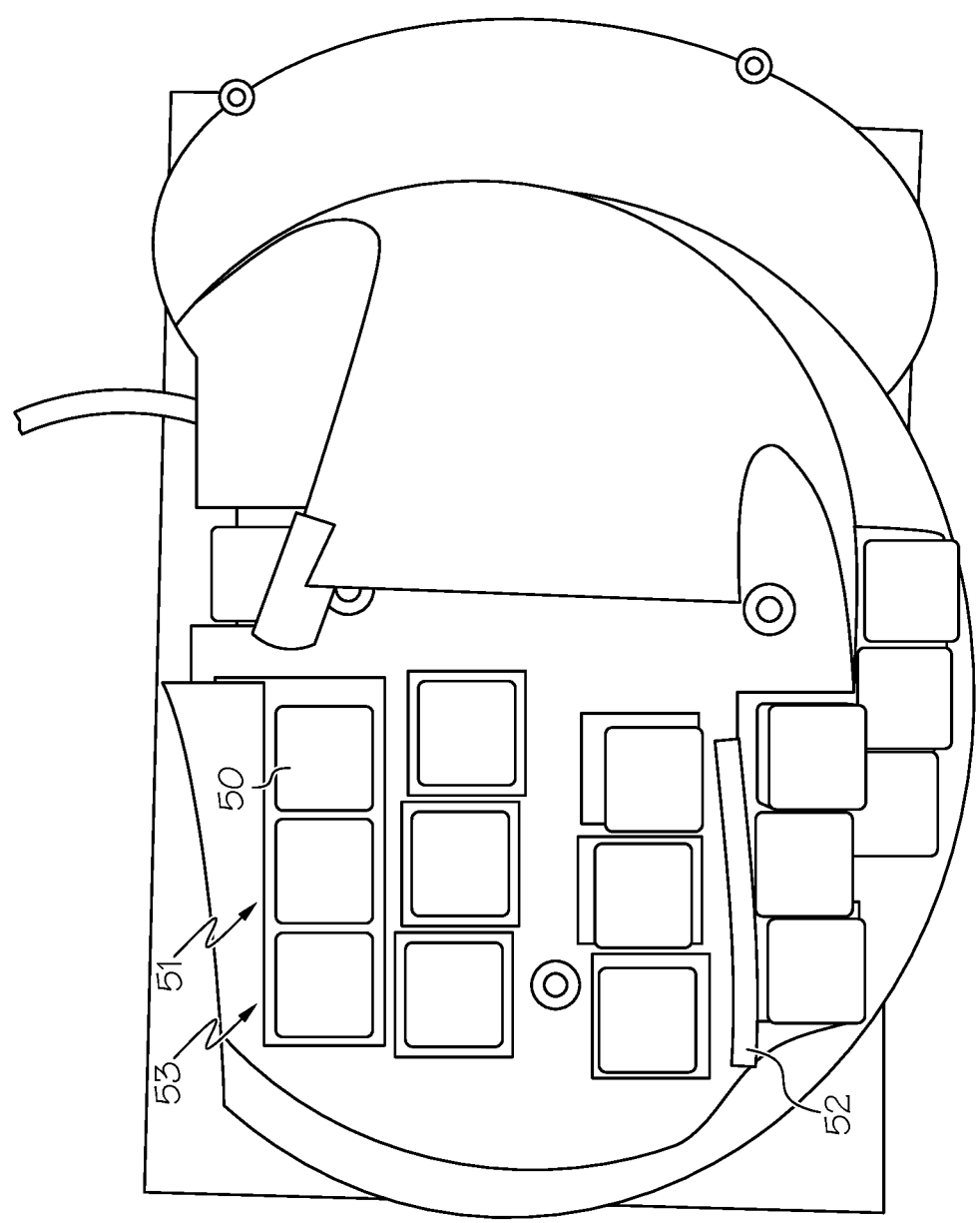
FIG. 14 shows an alternate embodiment with a finger separator and three rows of keys.

FIG. 14 shows an alternate embodiment which includes three rows of keys with the row 50 closest to the palm raised above the other two rows, and two rows 51 and 53 furthest from the palm. There is also a finger separator plate 52.

Figure 15:
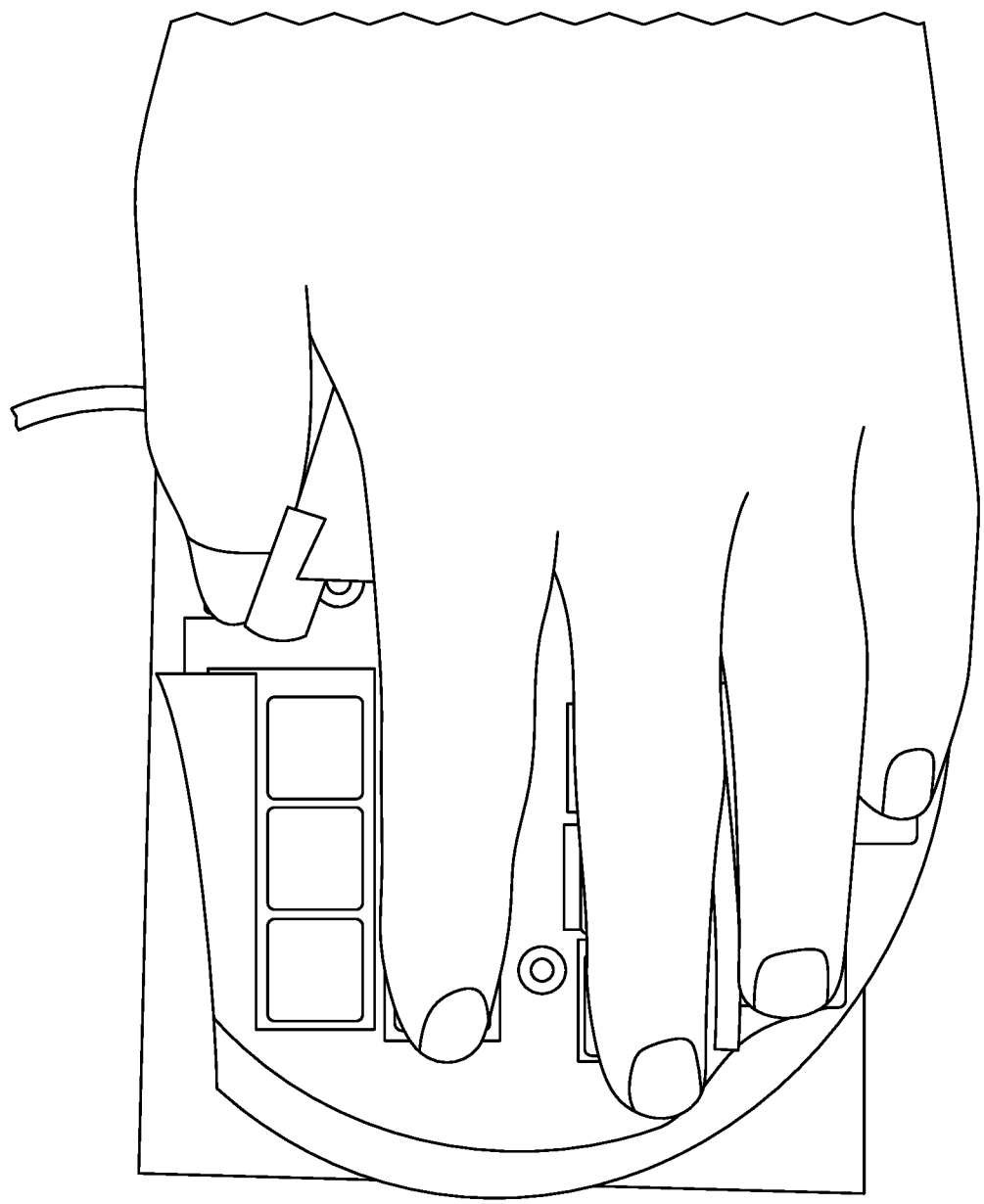
FIG. 15 shows the alternate embodiment with an example hand placement.

FIG. 15 shows an exemplary hand placement with the finger separator between the ring finger and the middle finger.

Figure 16:
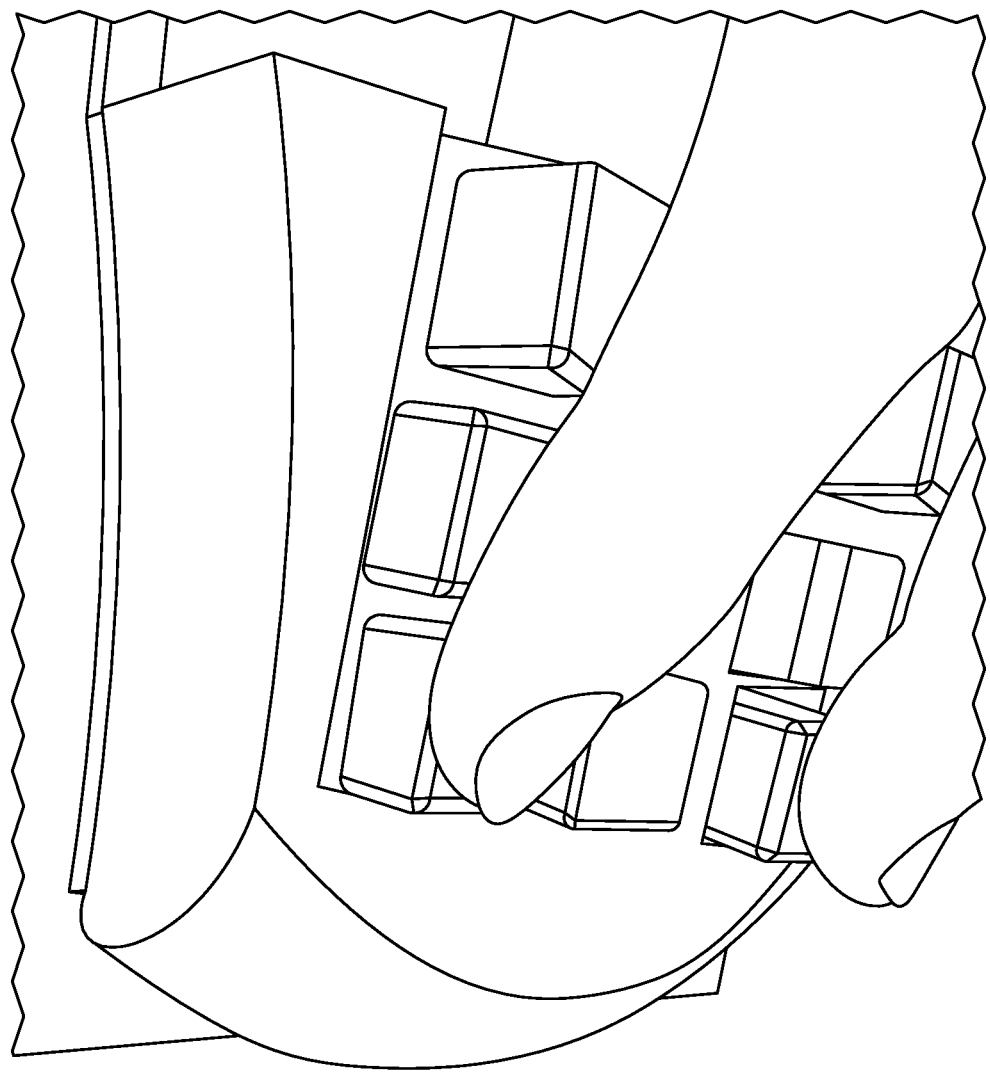
FIG. 16 shows the alternate embodiment with the index finder arched forward to reach the front most key.

FIG. 16 shows the index finger arched forward to reach the forward most row of keys.

Figure 17:
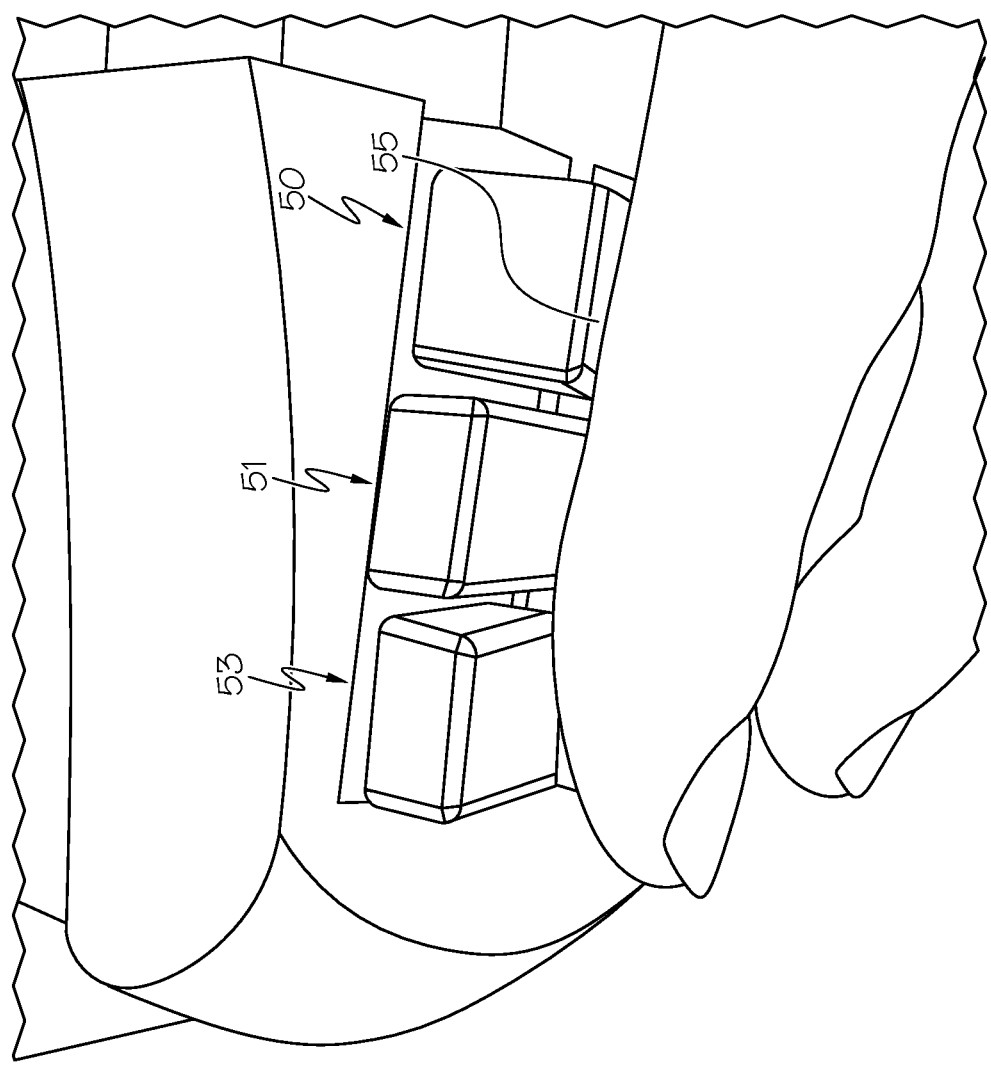
FIG. 17 shows the alternate embodiment with the index finger flattened to depress the raised first row key.

FIG. 17 shows the index finger straightened or flattened out so enable striking the raised rearmost key, shown at 53. In use, the users fingers arch over to reach the front and second rows of keys 51 and 53 and the user presses the row 50 keys be straightening out a finger and pressing down with the portion of the finger between the middle knuckle and the palm knuckle. The row 50 keys are raised above the row 51 and 53 keys to enable the pressing of the row 50 keys as described above.

Figure 18:
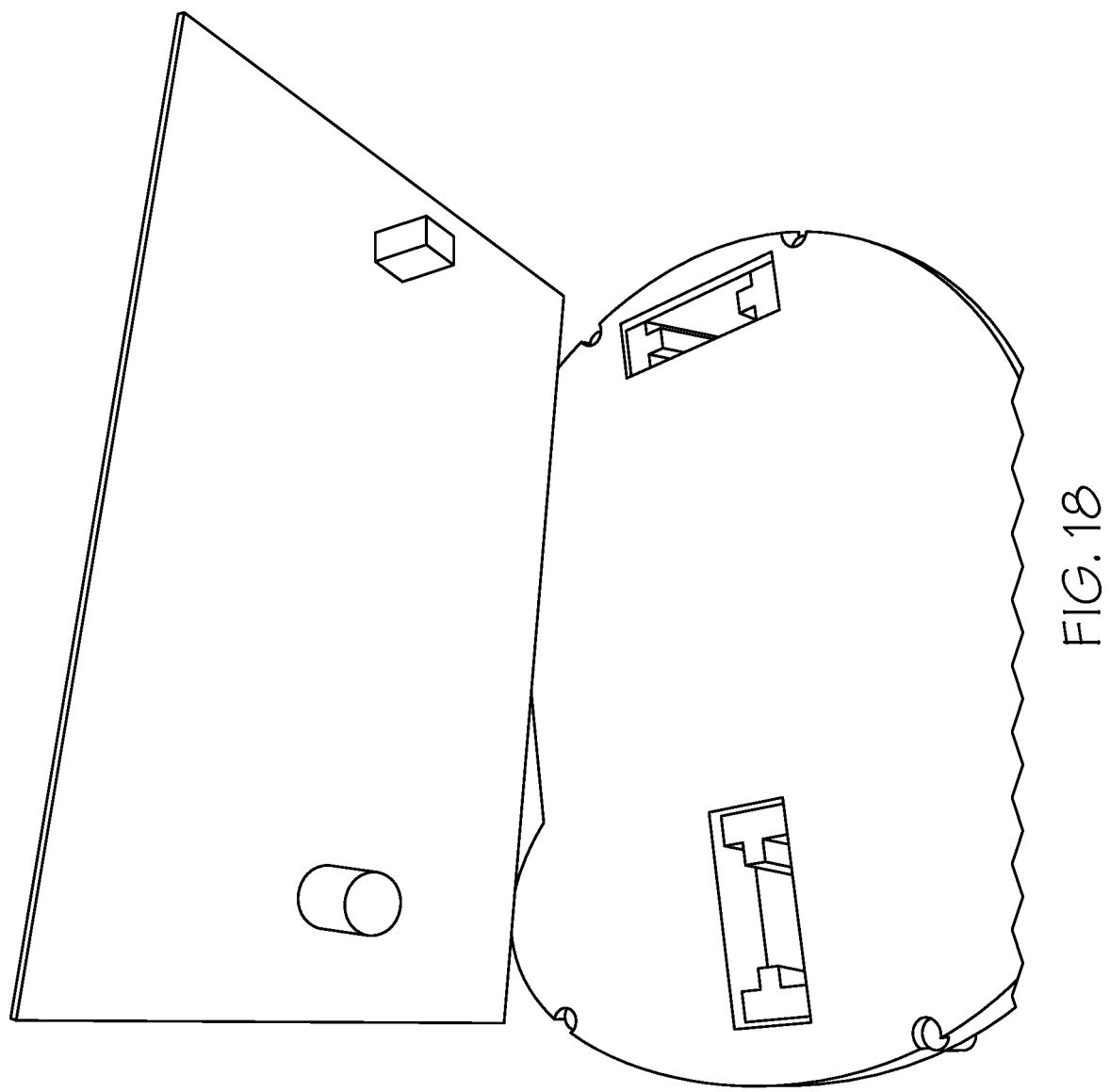
FIG. 18 shows the alternate embodiment with the bottom portion and the upper portion.

FIG. 18 shows slightly smaller projections from the base portion which operate the same as described above.

Figure 19:
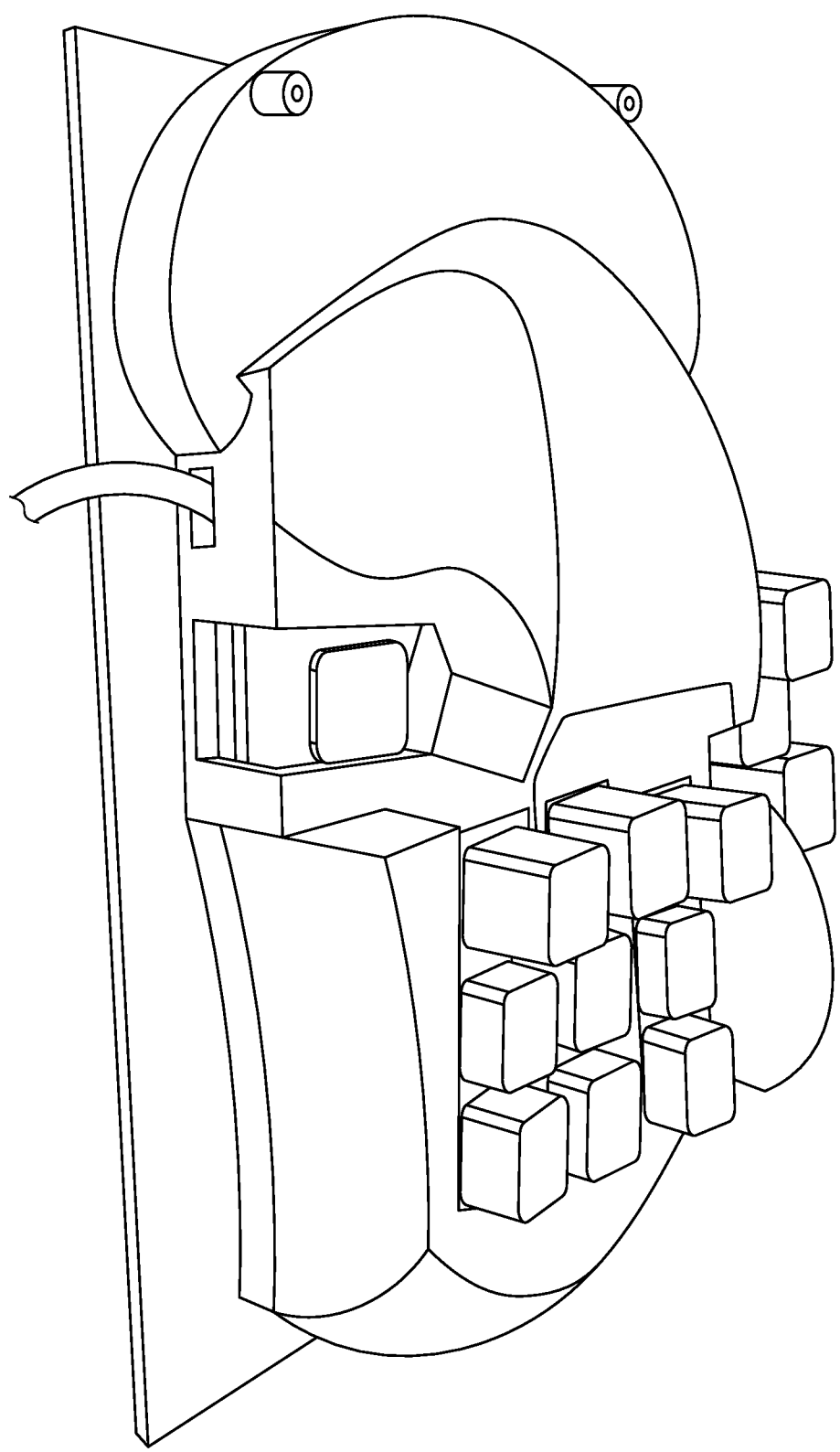
FIG. 19 shows the alternate embodiment with the thumb key and the circuit board with the wired connector.

FIG. 19 shows a side view showing the thumb key, the circuit board and the wired connector which is attached to the circuit board and which connects the controller to the game platform or computer.

Figure 20:
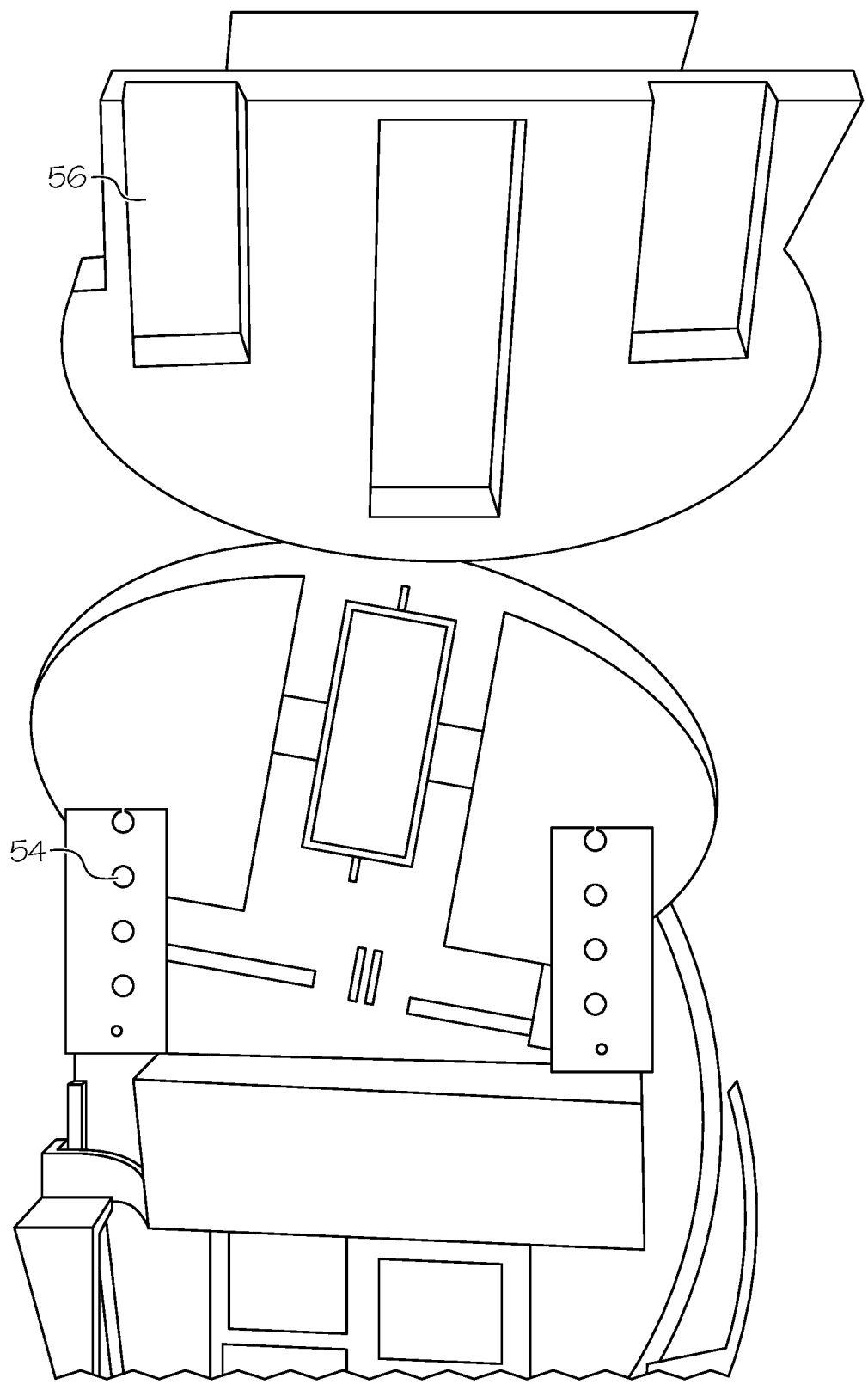
FIG. 20 shows another alternate embodiment with slots and rails for adjustably connecting the palm portion to the upper portion.

FIG. 20 shows another alternate embodiment with two rails 54 onto which a an adjustable palm portion slides using slots 56 (upside down in this picture to show the slots).

Figure 21:
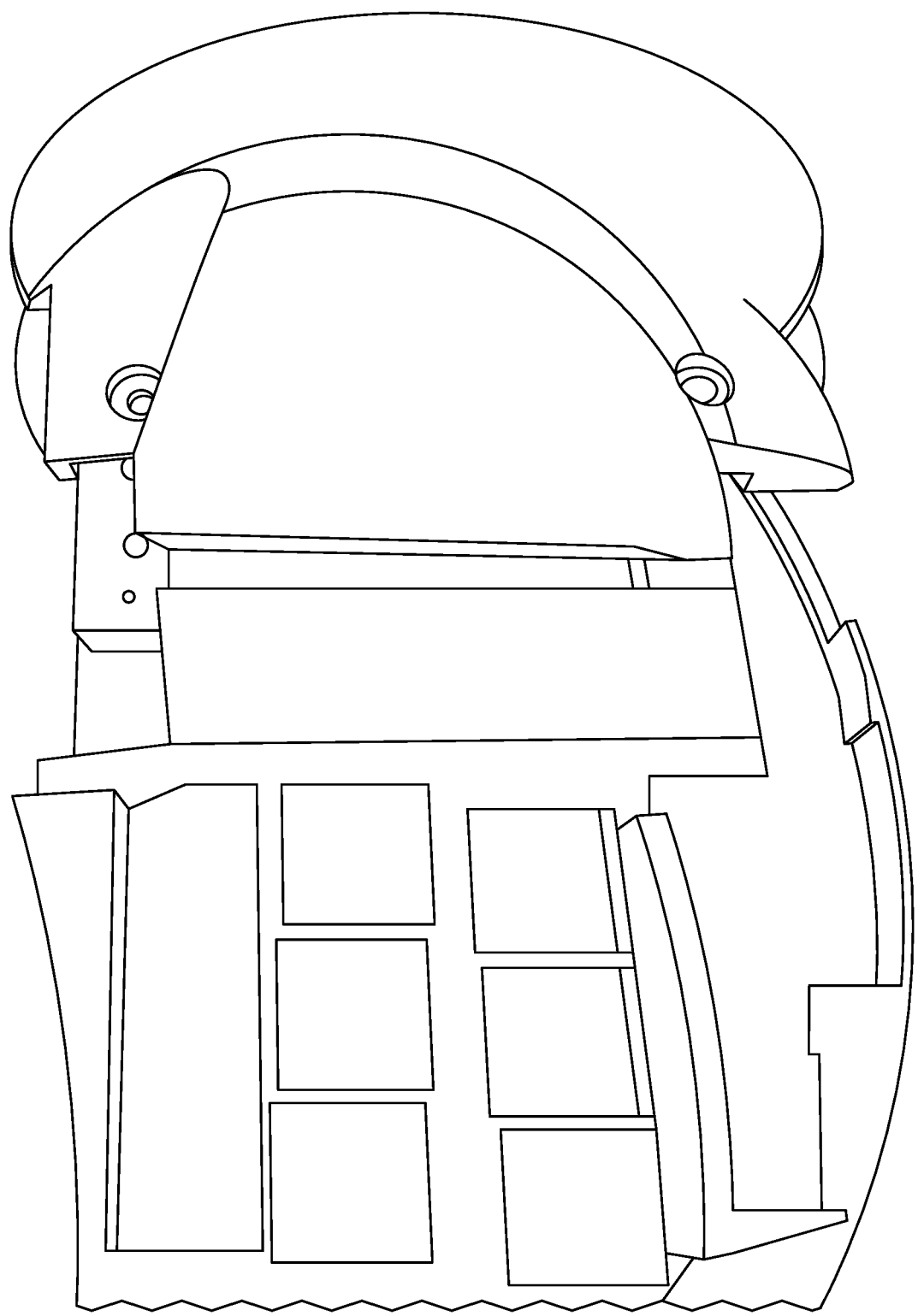
FIG. 21 shows the other alternate embodiment assembled.

FIG. 21 shows the slots partially slid onto the rails.

Figure 22:
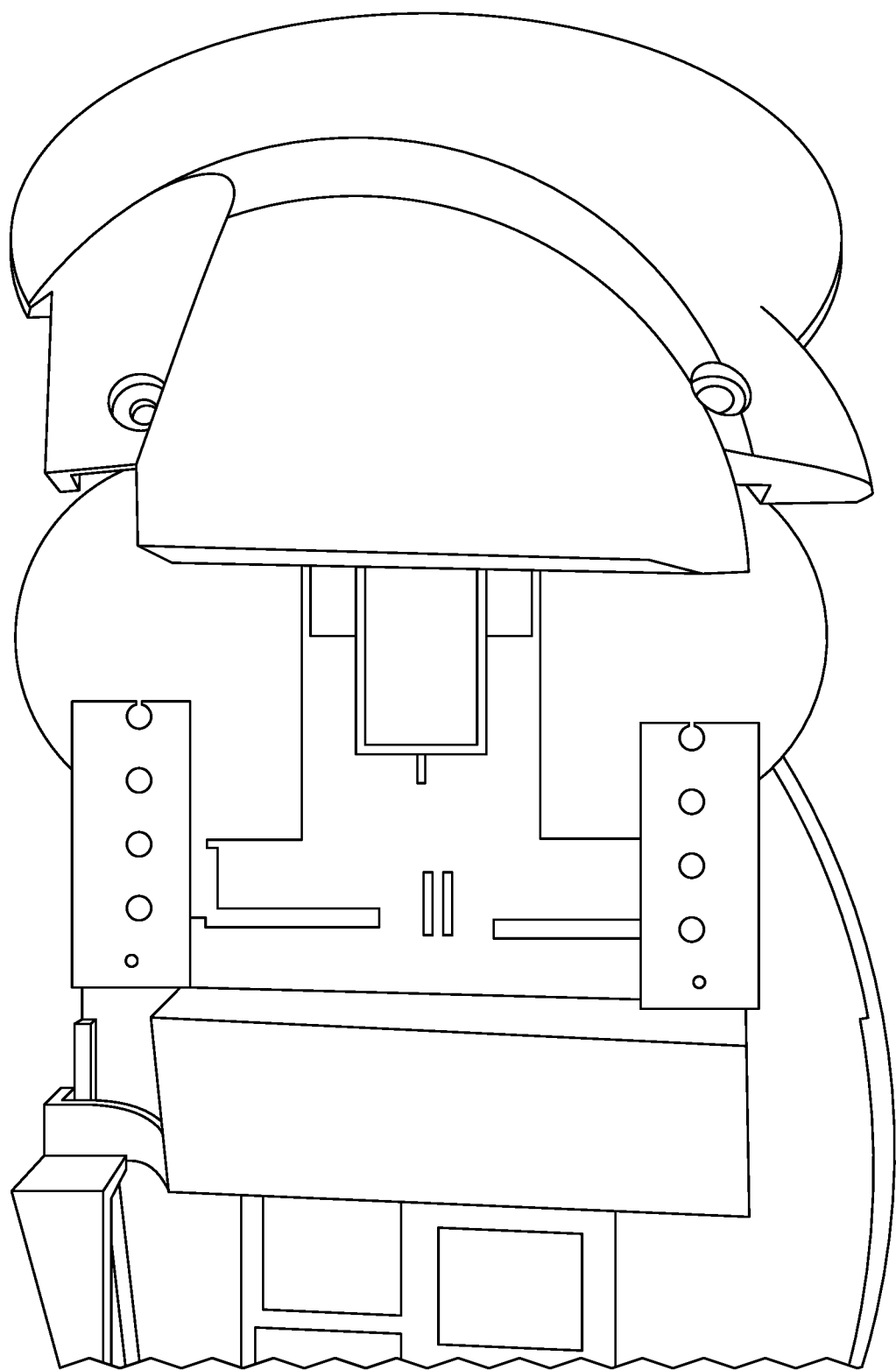

FIG. 22 shows the palm portion prior to being slid onto the rails.

It should be understood that the features of the various embodiments can be incorporated together, as desired. For example, the riser 34 and back finger keys 38 of FIGS. 4-7 could be combined with the finger separator 52 of FIG. 14 and/or the raised keys of row 50 of FIGS. 14 and 17.

What is claimed is:

1. A game controller comprising:
   a base portion;
   an upper portion;
   the base portion and the upper portion constructed and arranged so that the base portion is stationary relative to the upper portion; and when the upper portion is moved parallel to the base portion, the game controller translates the relative motion of the upper portion to the base portion into programmable keystrokes or analog movements, which in turn correspond to movements with the game; the upper portion moving forward relative to the base portion translates to forward movement in the game; the upper portion moving backwards relative to the base portion translates to backwards movement in the game; the upper portion moving left or twisting left relative to the base portion translates to spinning left or strafing left in the game; the upper portion moving right or twisting right relative to the base portion translates to right spinning or right strafing in the game;

the upper portion having a palm portion, a raised portion over which the fingers extend, and a plurality of user defined function keys arranged in at least one row;

an electronic device electrically connected to the plurality of user defined function keys, and a connector for connecting the game controller to a computer.

2. The game controller of claim 1 wherein there are three rows of four user defined function keys.

3. The game controller of claim 2 wherein there is a thumb switch on the side of the raised portion.

4. A game controller controller comprising:

a base portion;

an upper portion;

the base portion and the upper portion constructed and arranged so that, the base portion is stationary relative to the upper portion; and when the upper portion is moved parallel to the base portion, the game controller translates the relative motion of the upper portion to the base portion into programmable keystrokes or analog movements, which in turn correspond to movements with the game; the upper portion moving forward relative to the base portion translates to forward movement in the game; the upper portion moving backwards relative to the base portion translates to backwards movement in the game; the upper portion moving left or twisting left relative to the base portion translates to spinning left or strafing left in the game; the upper portion moving right or twisting right relative to the base portion translates to right spinning or right strafing in the game;

the upper portion having a palm portion, a raised portion over which the fingers extend, and a plurality of user defined function keys arranged in at least one row;

an electronic device electrically connected to the plurality of user defined function keys, a connector for connecting the game controller to a computer, and further including a plurality of user defined back finger actuated function keys carried above the plurality of user defined function keys.

5. The game controller of claim 4 further including a position sensor for controlling the position of an object or player-character in a game, the position sensor being electrically connected to the computer or electronic device.

6. The game controller of claim 5 wherein the upper portion repositions itself back to a center position when the user releases tension from the device.

7. The game controller of claim 6 wherein the position sensor is comprised of a projection from the base portion and a pair of buttons under the upper portion which interact with the projection and control the forward and backwards position of the object in the game, by movement of the upper portion forward and backward relative to the base portion.

8. The game controller of claim 7 further including a second projection from the base portion and a second pair of buttons under the upper portion which interact with the second projection and control the side to side position of the object in the game, by movement of the upper portion side to side relative to the base portion.

9. The game controller of claim 4 further including a joystick sensor for controlling the position of an object in a game, the joystick sensor being electrically connected to the electronic device.

10. The game controller of claim 9 wherein the joystick sensor is comprised of a joystick portion connected to the base portion which is comprised of four keyboard keys and which fits into am opening on the bottom of the upper portion.

11. The game controller of claim 4 wherein the palm portion can be adjustably connecting to the base portion to accommodate different hand sizes.

12. The game controller of claim 1 wherein an upper palm portion can be adjustably connecting to the base portion to accommodate different hand sizes.

13. The game controller of claim 4 wherein the thumb portion can be adjustably connecting to the base portion to accommodate different hand sizes.

14. A game controller comprising:

a base portion;

an upper portion;

the base portion and the upper portion constructed and arranged so that the base portion is stationary relative to the upper portion; and when the upper portion is moved parallel to the base portion, the game controller translates the relative motion of the upper portion to the base portion into programmable keystrokes or analog movements, which in turn correspond to movements with the game; the upper portion moving forward relative to the base portion translates to forward movement in the game; the upper portion moving backwards relative to the base portion translates to backwards movement in the game; the upper portion moving left or twisting left relative to the base portion translates to spinning left or strafing left in the game; the upper portion moving right or twisting right relative to the base portion translates to right spinning or right strafing in the game;

the upper portion having a palm portion, a raised portion over which the fingers extend, and a plurality of user defined function keys arranged in three rows, with the row closest to the palm portion raised higher than the other rows; so that arching a finger allows striking the front two rows of keys, while flattening the finger allows striking the back raised key;

an electronic device electrically connected to the plurality of user defined function keys, a connector for connecting the game controller to a computer, and further wherein the rows of keys are arranged into a plurality of columns and further including a finger separator plate arranged between two of the plurality of columns.

15. The game controller of claim 14 further including a support connected to the controller to hold a plurality of user defined back finger actuated function keys carried above the three rows of user defined function keys, which are actuated by raising a finger to depress one of the user defined back finger actuated function keys by pushing upwards on the key.

* * * * *